US008430759B2

(12) United States Patent
Wanthal

(10) Patent No.: US 8,430,759 B2
(45) Date of Patent: *Apr. 30, 2013

(54) JOINT FOR COMPOSITE TUBE

(75) Inventor: Steven P. Wanthal, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/427,877

(22) Filed: Mar. 22, 2012

(65) Prior Publication Data

US 2012/0183347 A1 Jul. 19, 2012

Related U.S. Application Data

(62) Division of application No. 11/934,198, filed on Nov. 2, 2007, now Pat. No. 8,161,619.

(51) Int. Cl.
*B21D 39/04* (2006.01)
*B23P 19/04* (2006.01)

(52) U.S. Cl.
USPC ......... 464/181; 29/527.1; 29/419.1; 464/183; 464/182; 403/267; 403/268; 403/311

(58) Field of Classification Search ............ 29/460, 29/527.2, 419.2, 456, 282, 240.5; 264/248, 264/249; 464/181, 182, 183; 403/364, 179, 403/182, 183, 184, 267, 268, 298, 294, 311, 403/309
See application file for complete search history.

(56) References Cited

U.S. PATENT DOCUMENTS

| 2,969,996 | A | * | 1/1961 | White, Jr. ..................... 403/274 |
| 3,554,307 | A | * | 1/1971 | Yount ............................ 175/323 |
| 3,592,884 | A | * | 7/1971 | Williams ........................... 264/5 |
| 4,014,184 | A | * | 3/1977 | Stark ............................. 464/180 |
| 4,125,000 | A | * | 11/1978 | Grob ............................. 464/162 |
| 4,265,951 | A |   | 5/1981 | Yates et al. |
| 4,275,122 | A | * | 6/1981 | Fisher ........................ 428/542.8 |
| 4,279,275 | A |   | 7/1981 | Stanwood et al. |
| 4,358,284 | A | * | 11/1982 | Federmann et al. .......... 464/181 |
| 4,421,497 | A | * | 12/1983 | Federmann et al. .......... 464/181 |
| 4,451,245 | A | * | 5/1984 | Hornig et al. ................. 464/181 |
| 4,523,872 | A | * | 6/1985 | Arena et al. .................. 403/274 |
| 4,663,819 | A | * | 5/1987 | Traylor ........................... 29/432 |
| 4,792,320 | A | * | 12/1988 | Nickel ........................... 464/181 |
| 4,807,351 | A | * | 2/1989 | Berg et al. ....................... 29/432 |

(Continued)

FOREIGN PATENT DOCUMENTS

GB         2215009        9/1989

OTHER PUBLICATIONS

International Search Report for PCT/US2008!080233, dated Jan. 23, 2009.

*Primary Examiner* — David Bryant
*Assistant Examiner* — Christopher Koehler

(57) ABSTRACT

A torque tube includes a composite body and an end fitting. The composite tube includes a body having a body interior diameter, a wall thickness, an end having an edge, and a set of helically-shaped grooves. Each helically-shaped groove may pass through the wall thickness. Each helically-shaped groove may begin at the edge and end in the body. The end fitting may include a sleeve configured to mate with the body interior diameter and a set of ribs configured to mate with the set of helically-shaped groove.

20 Claims, 8 Drawing Sheets

U.S. PATENT DOCUMENTS

| | | | |
|---|---|---|---|
| 4,834,932 A | 5/1989 | Salzman et al. | |
| 4,930,204 A * | 6/1990 | Schurter | 29/419.2 |
| 4,932,924 A * | 6/1990 | Lobel | 464/181 |
| 4,952,195 A * | 8/1990 | Traylor | 464/181 |
| 5,322,580 A * | 6/1994 | McIntire et al. | 156/148 |
| 5,342,464 A * | 8/1994 | McIntire et al. | 156/172 |
| 5,601,494 A * | 2/1997 | Duggan | 464/182 |
| 5,771,737 A * | 6/1998 | Yaegashi | 72/370.19 |
| 5,855,053 A * | 1/1999 | Arena | 29/523 |
| 6,336,986 B1 * | 1/2002 | Lee et al. | 156/172 |
| 6,682,436 B2 * | 1/2004 | Kimoto et al. | 464/181 |
| 6,863,763 B2 * | 3/2005 | Lee et al. | 156/188 |
| 6,902,508 B2 * | 6/2005 | Stille et al. | 475/331 |
| 7,363,945 B2 * | 4/2008 | Saha et al. | 138/109 |
| 7,442,127 B2 * | 10/2008 | Kai et al. | 464/181 |
| 7,485,045 B2 * | 2/2009 | Williams | 464/181 |
| 7,682,256 B2 * | 3/2010 | Brace et al. | 464/181 |
| 8,161,619 B2 * | 4/2012 | Wanthal | 29/460 |
| 2002/0032065 A1 * | 3/2002 | Suzuki et al. | 464/181 |
| 2003/0125117 A1 * | 7/2003 | Burkett | 464/181 |
| 2005/0159229 A1 * | 7/2005 | Lee et al. | 464/181 |
| 2009/0116898 A1 * | 5/2009 | Wanthal | 403/179 |

* cited by examiner

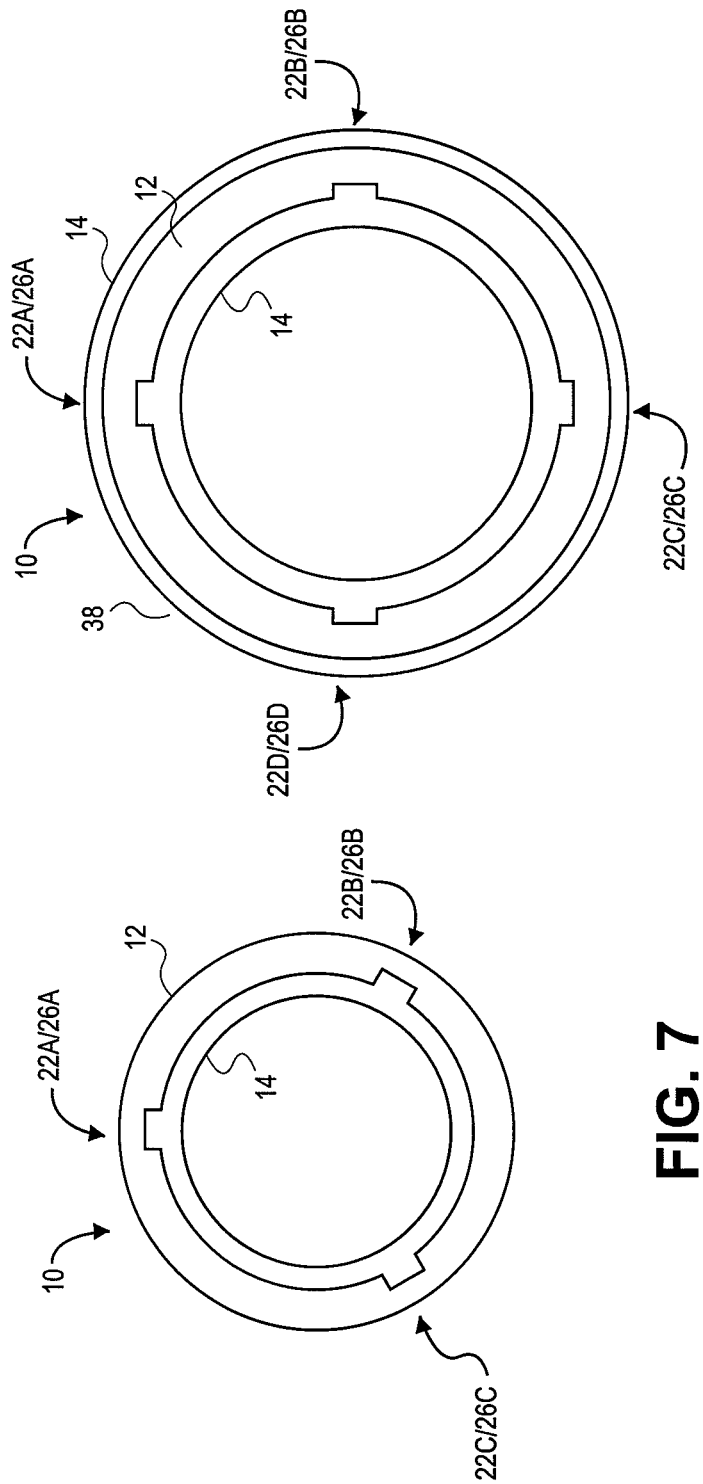

JOINT FOR COMPOSITE TUBE

CROSS-REFERENCE TO RELATED APPLICATIONS

This application claims priority to U.S. application Ser. No. 11/934,198, now U.S. Pat. No. 8,161,619 entitled JOINT FOR HYBRID COMPOSITE ITEMS issued on Apr. 24, 2012, the entire contents of which is expressly incorporated herein by reference.

FIELD

The present disclosure generally relates to fabrication of composite items. More particularly, the present disclosure pertains to a configuration for joining a composite tube to an end fitting of a dissimilar material.

BACKGROUND

Composite materials have been used increasingly in a variety of industries, including the automotive, marine and aerospace industries. In these applications, composites often include strong fibrous materials, such as carbon, aramid, glass or quartz, bonded together with a resin, such as an epoxy. Composite materials generally possess a high strength to weight ratio in comparison to metals and plastics. These attributes enable composite items to be made lighter and/or stronger than conventional metal parts.

However, fabrication of composite items is relatively more complicated than metal fabrication. Generally, composite items are built up, layer upon layer on a mold or the fiber component is placed and then impregnated with resin. Afterward the item is cured and removed from the mold. While some shapes are relatively easy to generate in this manner, others are not. In addition, while composites are quite strong, they are generally not as tough as metals. Conventionally, when dissimilar qualities are to be combined in a single component, two materials are welded, glued, or otherwise joined together. For example, a dense plastic film may be glued to a foamed plastic to form a light, abrasion resistant material. Unfortunately, conventional adhesives and joining methods may not form adequate bonds when joining high strength carbon fiber composites to metals. Furthermore, many safety-critical bonded structures, such as primary aircraft structures, may be required to have redundant load paths which allow the structure to continue performing even if the primary adhesive bond fails.

Accordingly, it is desirable to provide a hybrid composite item that includes dissimilar materials joined together, where this joint is capable of overcoming the disadvantages described herein at least to some extent.

BRIEF SUMMARY

The foregoing needs are met, to a great extent, by embodiments the present disclosure, wherein in one respect a joint and method is provided that in some embodiments facilitates joining dissimilar materials together.

An embodiment relates to a fail-safe torque tube for an aircraft. The torque tube includes a composite body and an end fitting. The composite tube includes a body having a body interior diameter, wall thickness, an end having an edge, and a set of grooves. Each groove of the set of grooves passes through the wall thickness. Each groove of the set of grooves begins at the edge and ends in the body. The end fitting includes a sleeve configured to mate with the body interior diameter and a set of ribs configured to mate with the set of grooves.

Another embodiment pertains to a fail-safe torque tube for an aircraft. The torque tube includes a composite body and an end fitting. The composite tube includes a body having a body interior diameter, wall thickness, an end having an edge, and a set of grooves. Each groove of the set of grooves is disposed through a portion of the wall thickness. Each groove of the set of grooves begins at the edge and ends in the body. The end fitting includes a sleeve configured to mate with the body interior diameter and a set of ribs configured to mate with the set of grooves.

Yet another embodiment relates to a method of providing a fail-safe load path for a torque tube in an aircraft. In this method, a torque tube is provided, a first end of the torque tube is secured to a first aircraft component in a load path and a second end of the torque tube is secured to a second aircraft component in the load path. The torque tube includes a composite body and a pair of end fitting. The composite tube includes a body having a body interior diameter, wall thickness, an end having an edge, and a set of grooves. Each groove of the set of grooves passes through the wall thickness. Each groove of the set of grooves begins at the edge and ends in the body. The end fittings includes a sleeve configured to mate with the body interior diameter and a set of ribs configured to mate with the set of grooves.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

BRIEF DESCRIPTION OF THE DRAWINGS

FIG. 7 is a cross-sectional view of the torque tube in accordance with another embodiment.

FIG. 8 is a cross-sectional view of the torque tube in accordance with another embodiment.

DETAILED DESCRIPTION

The present disclosure provides a device and method for providing a fail-safe torque tube to transmit torque along a load path of an aircraft. The torque tube device includes a composite tube body secured to metal end fittings. The composite tube body is relatively lighter than current metal tube bodies. The metal end fittings provide a durable connection between the torque tube and components attached to the torque tube. To join the composite tube body to the end fitting, an improved joint conformation is utilized. As described herein, an embodiment of this improved joint provides an efficient fail-safe connection between the torque tube and the end fitting. For the purpose of this disclosure, the term, "fail-safe" refers to a device, system, and method having a redundant feature. For example, as used herein, the term "fail-safe torque tube" refers to a torque transmission device with a redundant load path. As such, in the event of a failure in one load path, a second load path is configured to transmit torque.

In an aircraft, a torque tube may be utilized to transmit torque from a motor or other such actuator to a control surface actuator. The control surface actuator modulates the attitude of a control surface on the wing, for example, and is therefore of critical importance to the operation of the aircraft. As such, it is an advantage of embodiments described herein that a primary and secondary load path for the transmission of torque is provided.

Figure 1:
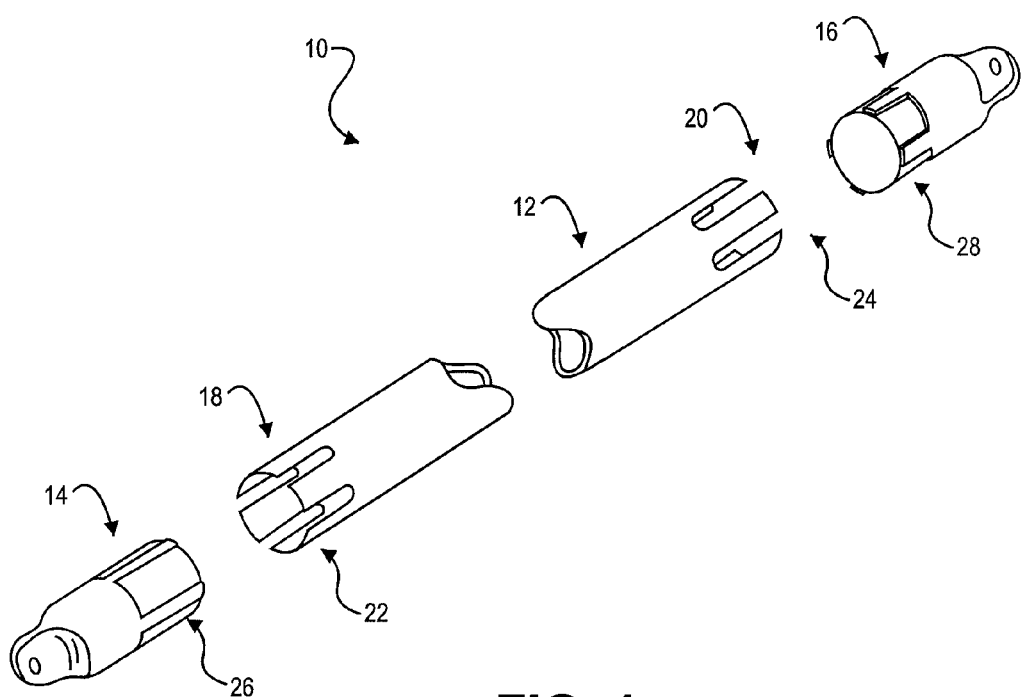
FIG. 1 is an exploded view of a torque tube in accordance with an embodiment.

The disclosure will now be described with reference to the drawing figures, in which like reference numerals refer to like parts throughout. FIG. 1 is an exploded view of a torque tube 10 in accordance with an embodiment. As shown in FIG. 1, the torque tube 10 includes a tube body 12 and end fittings 14 and 16.

The tube body 12 may include any suitable material. Examples of suitable materials include fiber reinforced plastics, metal foil and/or film reinforced plastics, and the like. Particularly suitable materials include, for example, carbon fiber reinforced plastic. The plastic matrix includes any suitable polymer such as, for example, epoxy and the like. The tube body 12 includes a first end 18 and a second end 20. The ends 18 and 20 include respective sets of grooves 22 and 24. The end fittings 14 and 16 include respective sets of ribs 26 and 28. For the sake of clarity, in the following description, an example will be made with reference to the end fitting 14 and end 18. It is to be noted that the following description of the end fitting 14 and end 18 may pertain to the end fitting 16 and end 20.

Figure 2:
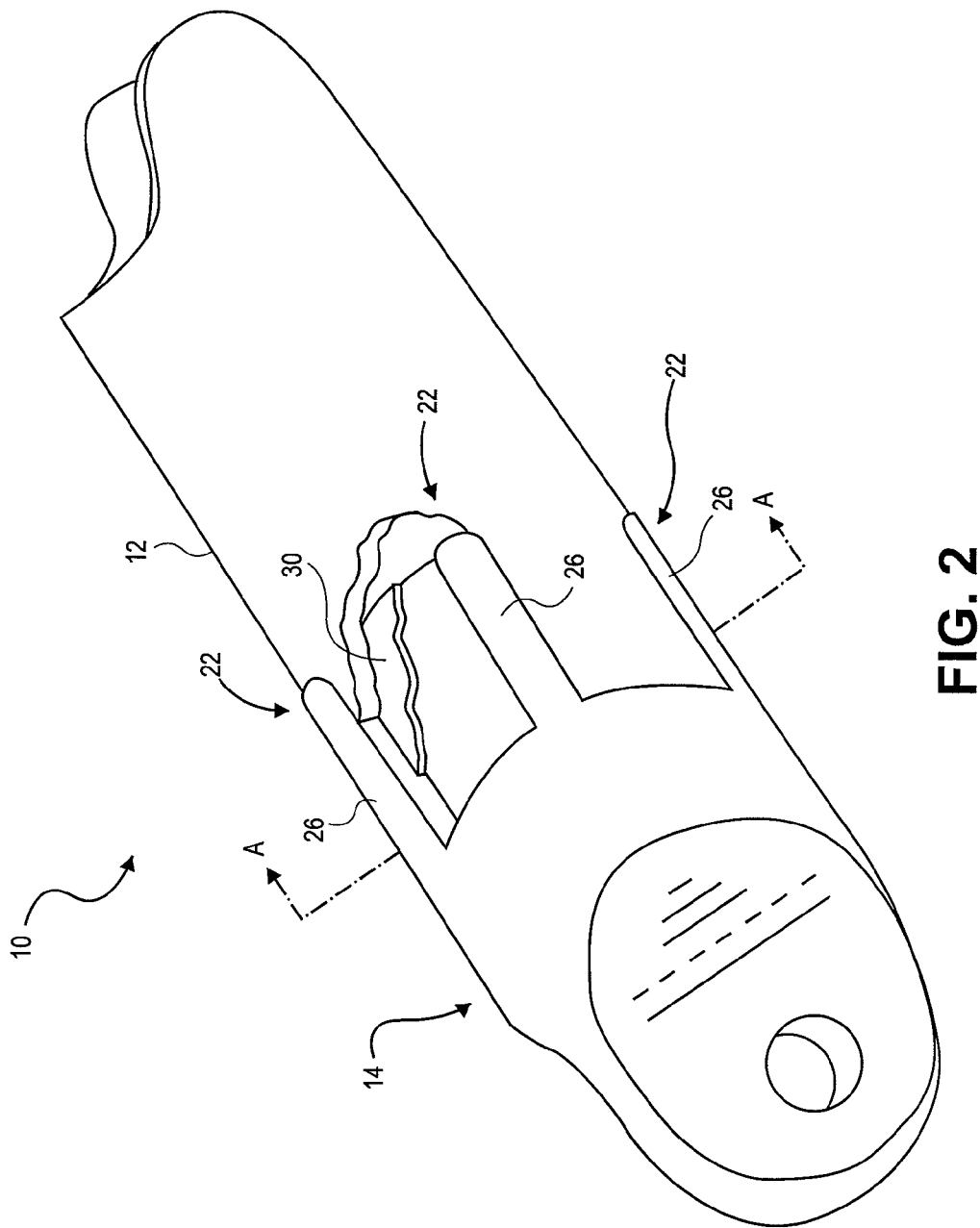
FIG. 2 is a partial cutaway view of the torque tube of FIG. 1.

FIG. 2 is a partial cutaway view of the torque tube 10 of FIG. 1. As shown in FIG. 2, the set of grooves 22 is configured to mate with the set of ribs 26. Also shown in FIG. 2, the torque tube 10 includes an adhesive 30 to affix the tube body 12 to the end fitting 14. The adhesive 30 may provide a primary load path from the tube body 12 to the end fitting 14. In the event the adhesive bond from the tube body 12 to the end fitting 14 via the adhesive 30 is compromised, the interface between the set of grooves 22 and the set of ribs 26 may provide a secondary load path from the tube body 12 to the end fitting 14.

It is another advantage of the torque tube 10 that the joint or interface between the set of grooves 22 and the set of ribs 26 may augment the adhesive bond. For example, in the event that a portion of the adhesive bond delaminates, the ribs 26 to either side of the delaminating portion may prevent or reduce the likelihood that the bond delamination may propagate to other portions of the adhesive bond.

Figure 3:
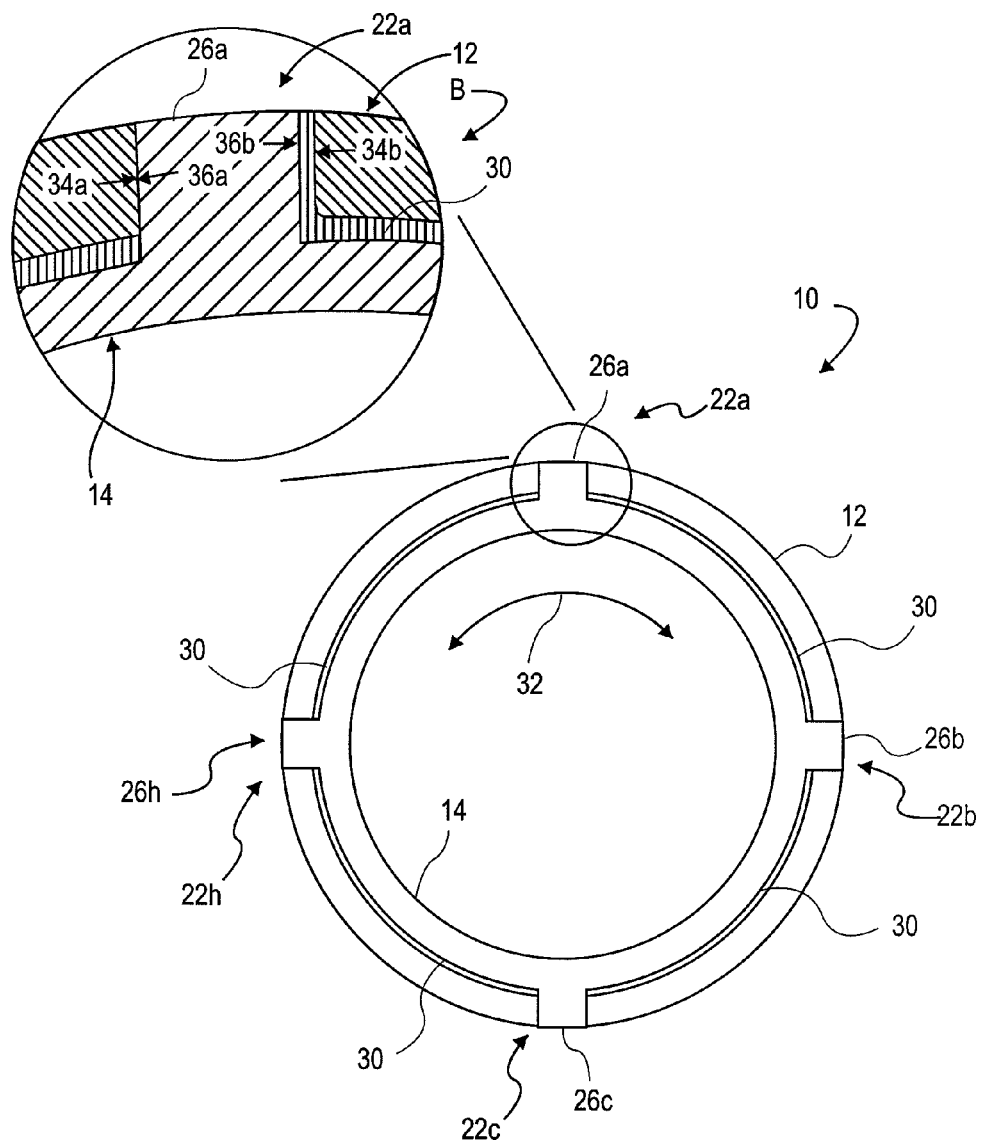
FIG. 3 is a cross-sectional view of the torque tube of FIG. 1.

FIG. 3 is a cross-sectional view A-A of the torque tube 10 of FIG. 1. As shown in FIG. 3, the set of grooves 22 includes grooves 22a to 22n. Also shown, the set of ribs 26 includes ribs 26a to 26n. Although four grooves 22a to 22n and four corresponding ribs 26a to 26n are shown in the particular example, in other examples, any suitable number from one to about ten grooves and corresponding ribs may be included in the torque tube 10.

The adhesive 30 is configured to bond the end fitting 14 to the tube body 12. As such, in response to torque being applied to the end fitting 14, the resulting load is translated through the adhesive 30 to the tube body 12 and the tube body 12 is urged to rotate as indicated by arrow 32. This adhesive bond may thus be considered the primary load path. In the event the primary load path is compromised, the torque tube 10 includes a secondary load path shown in inset B. As shown in inset B, groove 22a includes bearing surfaces 34a and 34b and the rib 26a includes corresponding bearing surfaces 36a and 36b. The bearing surface 34a is configured to bear upon the bearing surface 36a. Similarly, the bearing surface 34b is configured to bear upon the bearing surface 36b. In this manner, torque may be translated between the tube body 12 and end fitting 14.

Also shown in inset B, the groove 22a may be fabricated slightly larger relative to the rib 26a. For example, to account for machining tolerances, a small gap may be anticipated. This gap may be preferable to binding caused by the groove 22a being relatively smaller than the rib 26a. The small gap between the bearing surfaces 36b and 34b may be filled with the adhesive 30 or any suitable shimming material. Examples of suitable shimming materials include metal and polymer shims, epoxy, epoxy thickened with cut fibers or powders, and the like. The expected loads exerted upon the adhesive 30 and/or shimming material disposed between the bearing surfaces 36b and 34b are compressive loads. As such, with regard to the secondary load path, the adhesive qualities of the adhesive 30 and/or shimming material disposed between the bearing surfaces 36b and 34b are unimportant. That is, failure of the adhesive 30 and/or shimming material disposed between the bearing surfaces 36b and 34b will not affect the integrity of the secondary load path.

Figure 4:
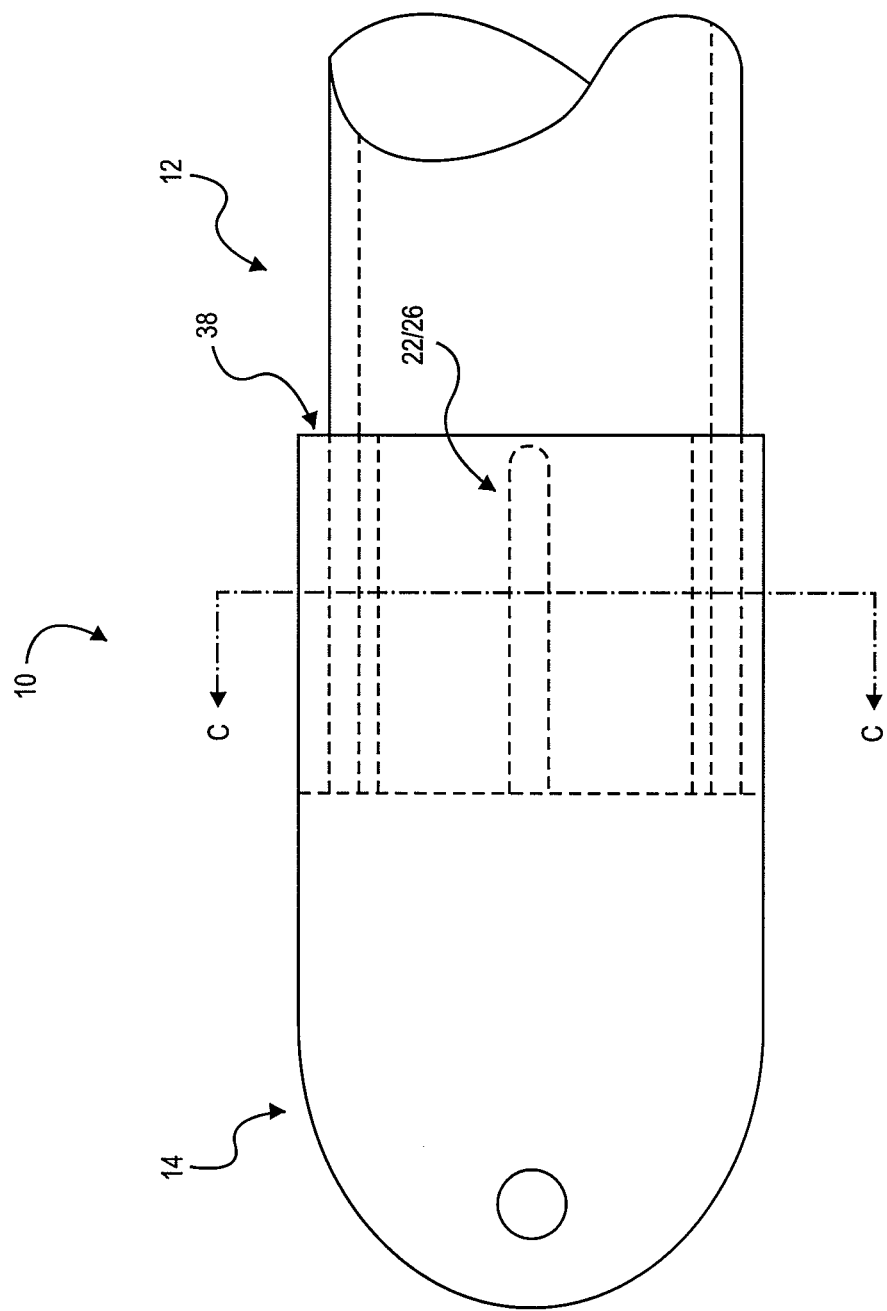
FIG. 4 is a hidden line view of a torque tube in accordance with another embodiment.

FIG. 4 is a hidden line view of the torque tube 10 in accordance with another embodiment. As shown in FIG. 4, the end fitting 14 includes an outer wall or sheath 38. The sheath 38 is configured to augment or strengthen the joint between the tube body 12 and end fitting 14. For example, by covering the portion of the tube body 12 between the grooves 22a to 22n, the sheath 38 acts to prevent the end of the tube body 12 from splaying outwardly. In addition, as shown in FIG. 5, the sheath 38 substantially doubles the adhesive area.

Figure 5:
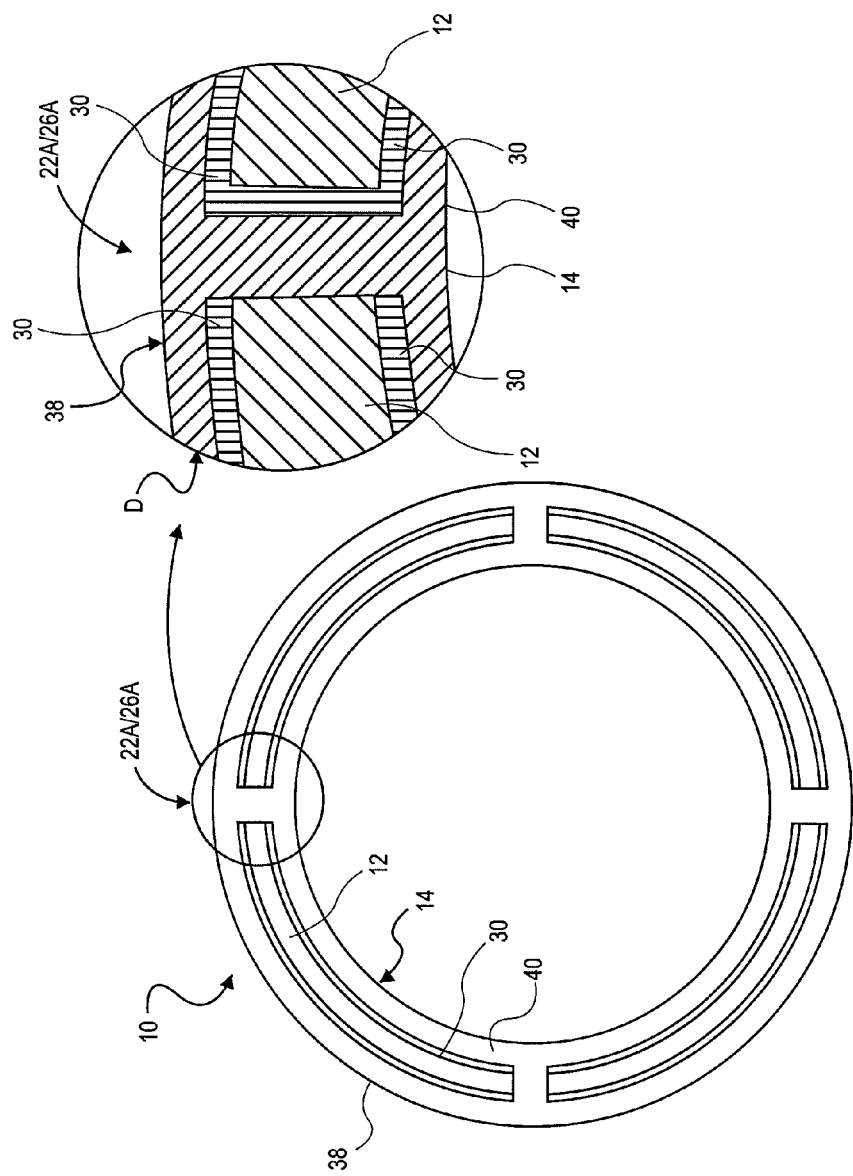
FIG. 5 is a cross-sectional view of the torque tube of FIG. 4.

FIG. 5 is a cross-sectional view C-C of the torque tube 10 of FIG. 4. As shown in FIG. 5, the tube body 12 is sandwiched between the sheath 38 and an inner wall or sleeve 40 of the end fitting 14. As shown in inset D, by sandwiching the tube body 12 thusly, a second layer of the adhesive 30 may be utilized to affix the tube body 12 to the end fitting 14. It is an advantage of this embodiment that the joint is approximately twice as strong as a joint formed by a single layer of the adhesive 30, all other factors being equal. In addition, depending upon a variety of factors such as joint failure characteristics, empirical data, and the like, it may be another advantage of this embodiment that the length of the set of grooves 22 and set of ribs 26 may be reduced as a result of the increased area of adhesion.

Figure 6:
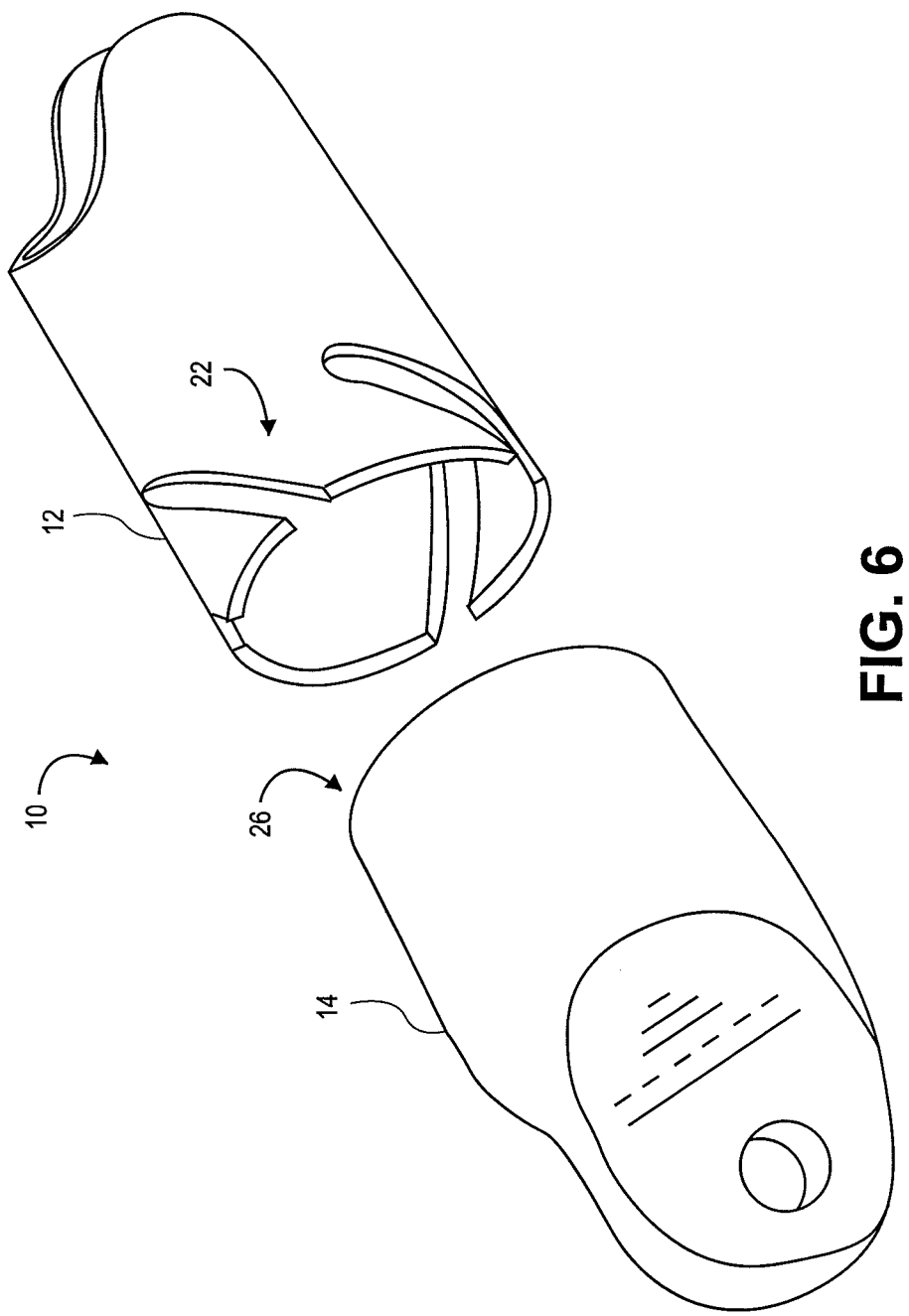
FIG. 6 is an exploded view of a torque tube in accordance with another embodiment.

FIG. 6 is an exploded view of the torque tube 10 in accordance with another embodiment. As shown in FIG. 6, the set of grooves 22 are helically shaped. Accordingly, although not shown in FIG. 6, the corresponding set of ribs 26 are configured to mate with the helically shaped set of grooves 22. It is an advantage of this embodiment that the assembled torque tube 10, may be utilized to also transmit axial loads. In a particular example, the torque tube 10 may be utilized to exert a pushing or pulling axial load instead of, or in addition to, a torsion load. If the tube body 12 and end fitting 14 are restrained from turning relative to one another, the helically interlocking set of grooves 22 and set of ribs essentially lock the tube body 12 and end fitting 14 together.

FIG. 7 is a cross-sectional view C-C of the torque tube 10 in accordance with another embodiment. As shown in FIG. 7, the torque tube 10 includes three grooves 22a to 22c and three corresponding ribs 26a to 26c. In addition, the grooves 22a to 22c pass through a portion of the tube body 12. That is, the grooves 22a to 22c do not pass through the wall of the tube body 12. Instead, the grooves 22a to 22c pass through about 50% of the wall thickness of the tube body 12. In other embodiments, the grooves 22a to 22c pass through from about 5% to about 90% of the wall thickness of the tube body 12. Accordingly, the ribs extend outwardly a corresponding amount.

Furthermore, the grooves 22a to 22c of FIG. 7 are shown extending into the wall of the tube body 12 from an interior surface of the tube body 12. However, in this or other embodiments, the grooves 22a to 22c may extend into the wall of the tube body 12 from an exterior surface of the tube body 12.

FIG. 8 is a cross-sectional view C-C of the torque tube 10 in accordance with another embodiment. As shown in FIG. 8, the torque tube 10 includes the grooves 22a to 22c that pass through a portion of the tube body 12 and the torque tube 10 includes the sheath 38.

Figure 9:
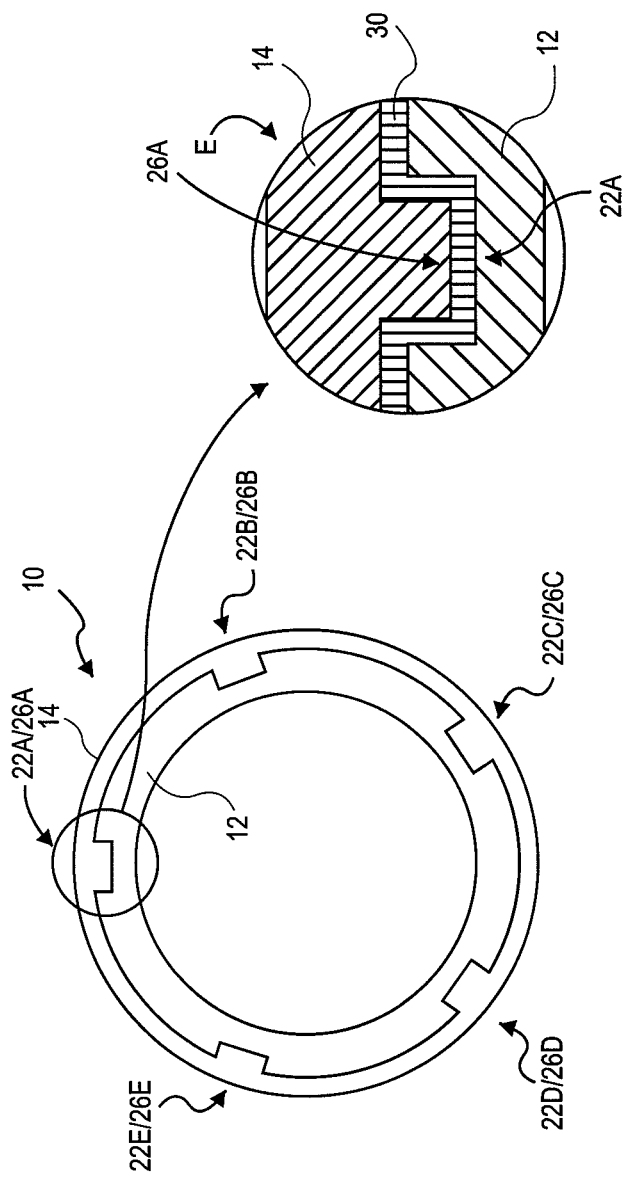
FIG. 9 is a cross-sectional view of the torque tube in accordance with another embodiment.

FIG. 9 is a cross-sectional view C-C of the torque tube 10 in accordance with another embodiment. As shown in FIG. 9, the torque tube 10 includes the grooves 22a to 22e and corresponding ribs 26a to 26e. In addition, the grooves 22a to 22e of FIG. 9 are shown extending into the wall of the tube body 12 from an exterior surface of the tube body 12. However, in this or other embodiments, the grooves 22a to 22e may extend into the wall of the tube body 12 from an interior surface of the tube body 12. As shown in inset E of FIG. 9, the adhesive 30 and/or a suitable shim material may be utilized to fill gaps between the groove 22a and rib 26a.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A torque tube for an aircraft, comprising:
a composite tube, including:
    a body having a body interior diameter and a body exterior diameter and including an end having an edge, the body interior diameter and the body exterior diameter being substantially constant along the end of the body to the edge thereof;
    a wall thickness; and
    a set of helically-shaped grooves, each groove of the set of grooves passing through at least a portion of the wall thickness, each groove of the set of grooves beginning at the edge and ending in the body; and
an end fitting comprising:
    a sleeve configured to mate with the body interior diameter;
    a set of ribs configured to mate with the set of helically-shaped grooves; and
    a sheath being integral with the sleeve and having a substantially constant sheath interior diameter configured to mate with the body exterior diameter, a portion of the body being sandwiched between the sleeve and the sheath.

2. The torque tube of claim 1, wherein:
each groove of the set of grooves is disposed through approximately 5 percent to approximately 95 percent of the wall thickness.

3. The torque tube of claim 2, wherein:
each groove of the set of grooves is disposed through approximately 50 percent of the wall thickness.

4. The torque tube of claim 1, wherein:
the set of grooves includes up to approximately ten grooves.

5. The torque tube of claim 4, wherein:
the set of grooves includes exactly four grooves.

6. The torque tube of claim 1, wherein:
the body is formed from at least one of the following materials: fiber reinforced plastic, metal foil, film reinforced plastic.

7. The torque tube of claim 6, wherein:
the fiber reinforced plastic comprises carbon fiber reinforced plastic.

8. The torque tube of claim 1, wherein:
the end fitting is formed of metal.

9. The torque tube of claim 1, further comprising:
adhesive installed between the body exterior diameter and the end fitting.

10. The torque tube of claim 1, wherein:
at least one of the grooves is larger than a corresponding one of the ribs and defining a gap therebetween; and
the gap between the groove and the rib being filled with at least one of the following materials: adhesive, metal shims, polymer shims, epoxy, epoxy thickened with cut fibers, epoxy thickened with powder.

11. The torque tube of claim 1, wherein:
the end fitting is secured to a component of the aircraft.

12. A torque tube for an aircraft, comprising:
a composite tube, including:
    a body having a body interior diameter and a body exterior diameter and including an end having an edge, the body interior diameter and the body exterior diameter being substantially constant along the end of the body to the edge thereof;
    a wall thickness; and
    a set of helically-shaped grooves, each groove of the set of grooves passing through at least a portion of the wall thickness, each groove of the set of grooves beginning at the edge and ending in the body, each one of the grooves including bearing surfaces; and
an end fitting comprising:
    a sleeve configured to mate with the body interior diameter;

a set of ribs configured to mate with the set of helically-shaped grooves, each one of the ribs including bearing surfaces corresponding to the groove bearing surfaces;

adhesive installed within a gap between the rib bearing surfaces and the groove bearing surfaces and a sheath being integral with the sleeve and having a substantially constant sheath interior diameter configured to mate with the body exterior diameter, a portion of the body being sandwiched between the sleeve and the sheath.

13. The torque tube of claim 12, wherein:
each groove of the set of grooves is disposed through approximately 5 percent to approximately 95 percent of the wall thickness.

14. The torque tube of claim 13, wherein:
each groove of the set of grooves is disposed through approximately 50 percent of the wall thickness.

15. The torque tube of claim 12, wherein:
the set of grooves includes up to approximately ten grooves.

16. The torque tube of claim 15, wherein:
the set of grooves includes exactly four grooves.

17. The torque tube of claim 12, wherein:
the body is formed from at least one of the following materials: fiber reinforced plastic, metal foil, film reinforced plastic.

18. The torque tube of claim 17, wherein:
the fiber reinforced plastic comprises carbon fiber reinforced plastic.

19. The torque tube of claim 12, wherein:
the end fitting is formed of metal.

20. The torque tube of claim 12, further comprising:
adhesive installed between the body exterior diameter and the end fitting.

* * * * *